Dec. 12, 1950     E. A. RUSSELL ET AL     2,534,148
COMBINED RADIANT AND AIR HEATING SYSTEM
Filed June 21, 1947     6 Sheets-Sheet 1
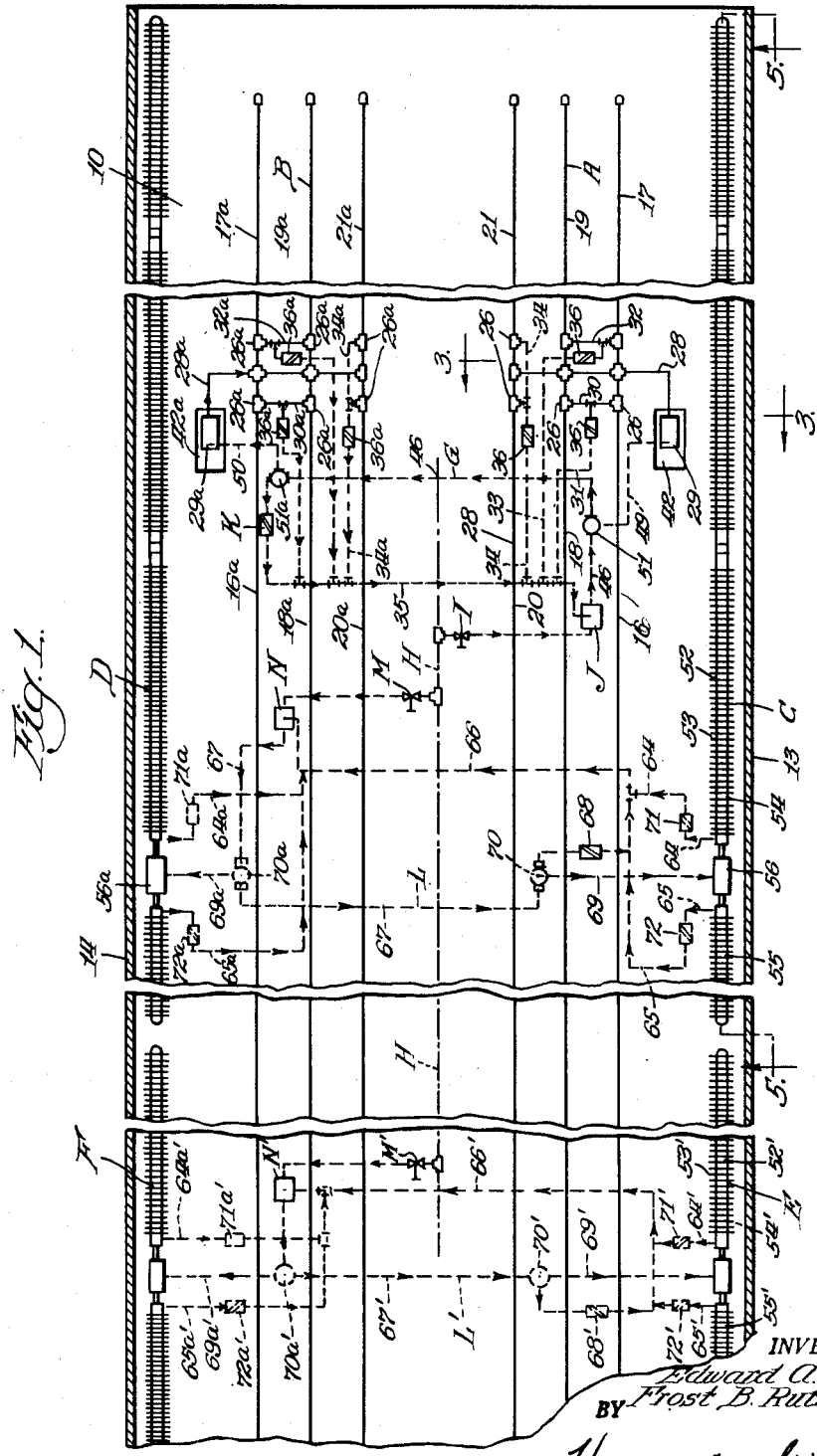
INVENTORS.
Edward A. Russell
Frost B. Rutherford
BY Harvey M. Gillespie
Atty.

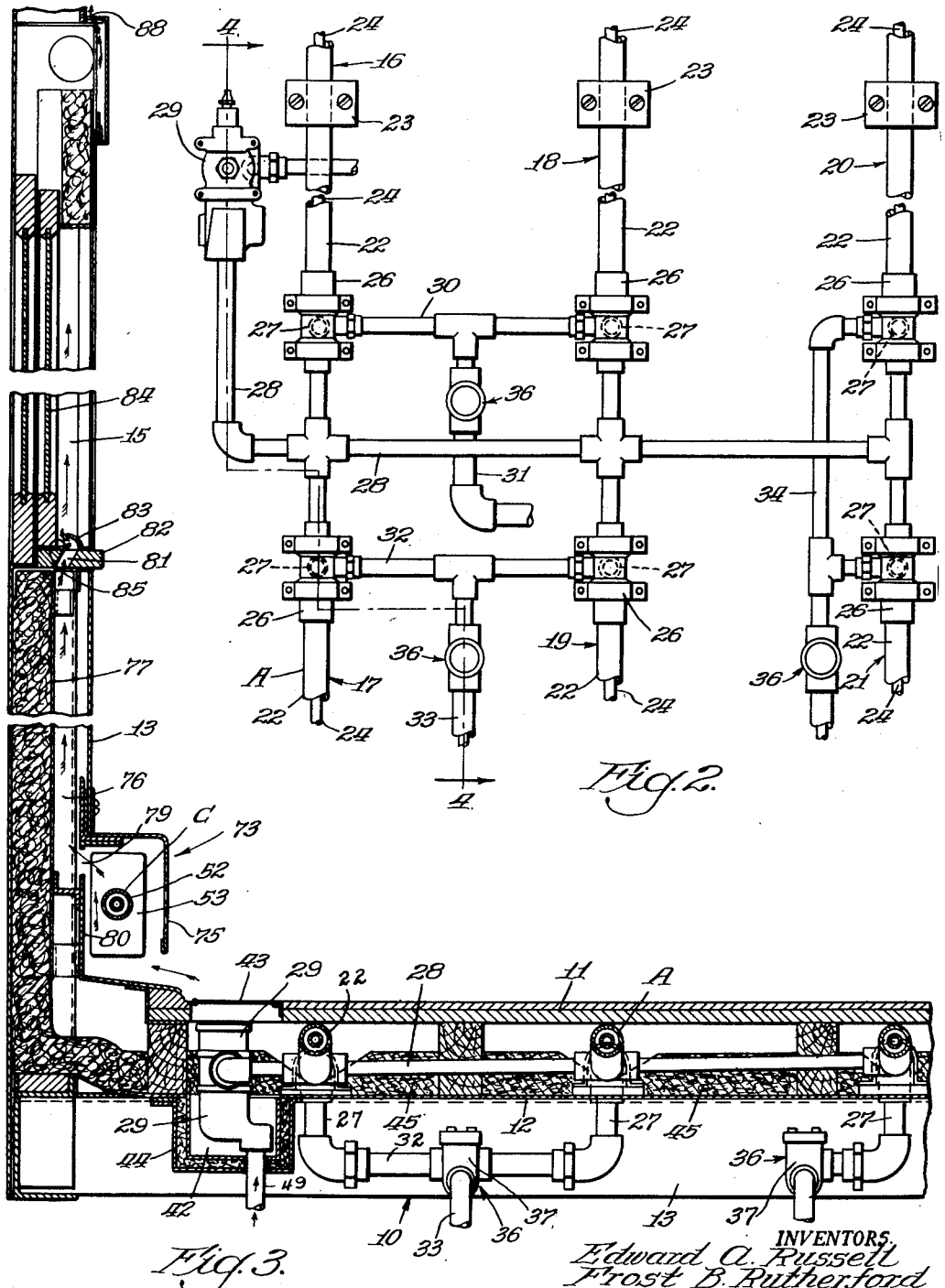

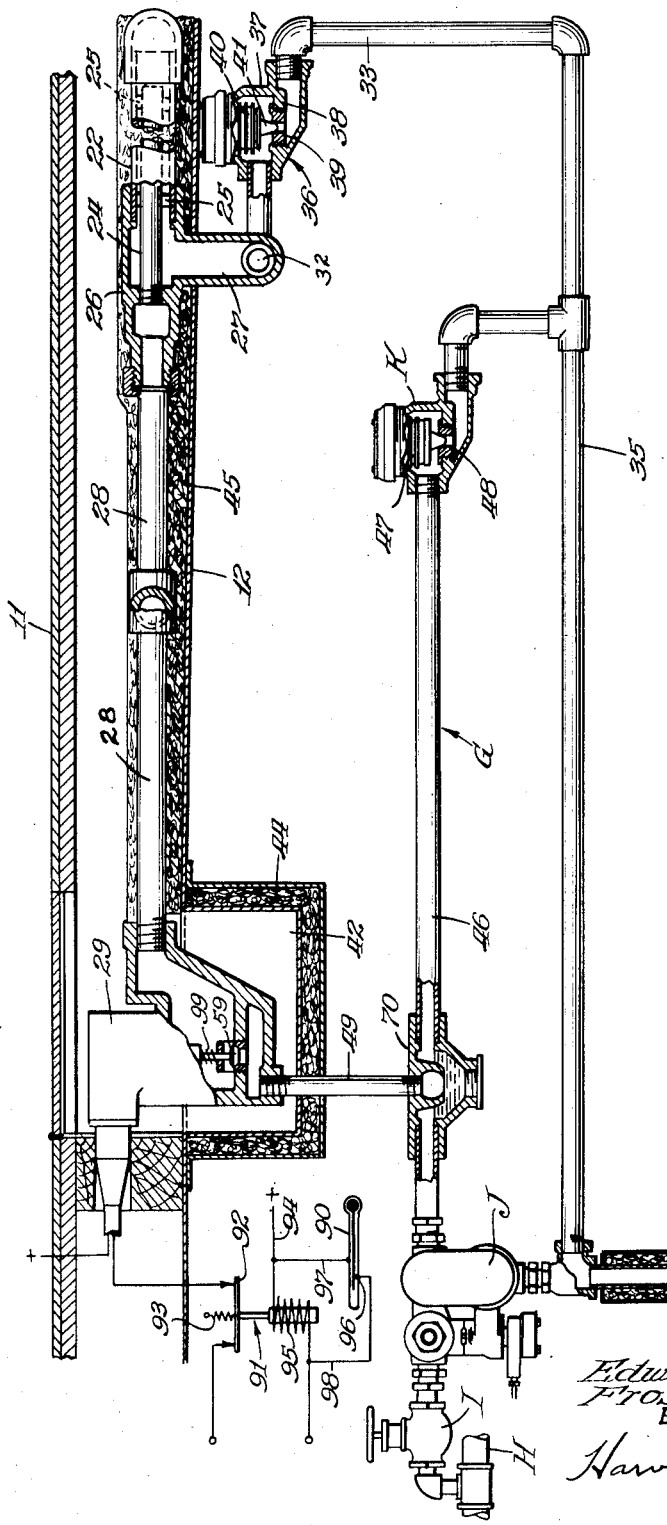

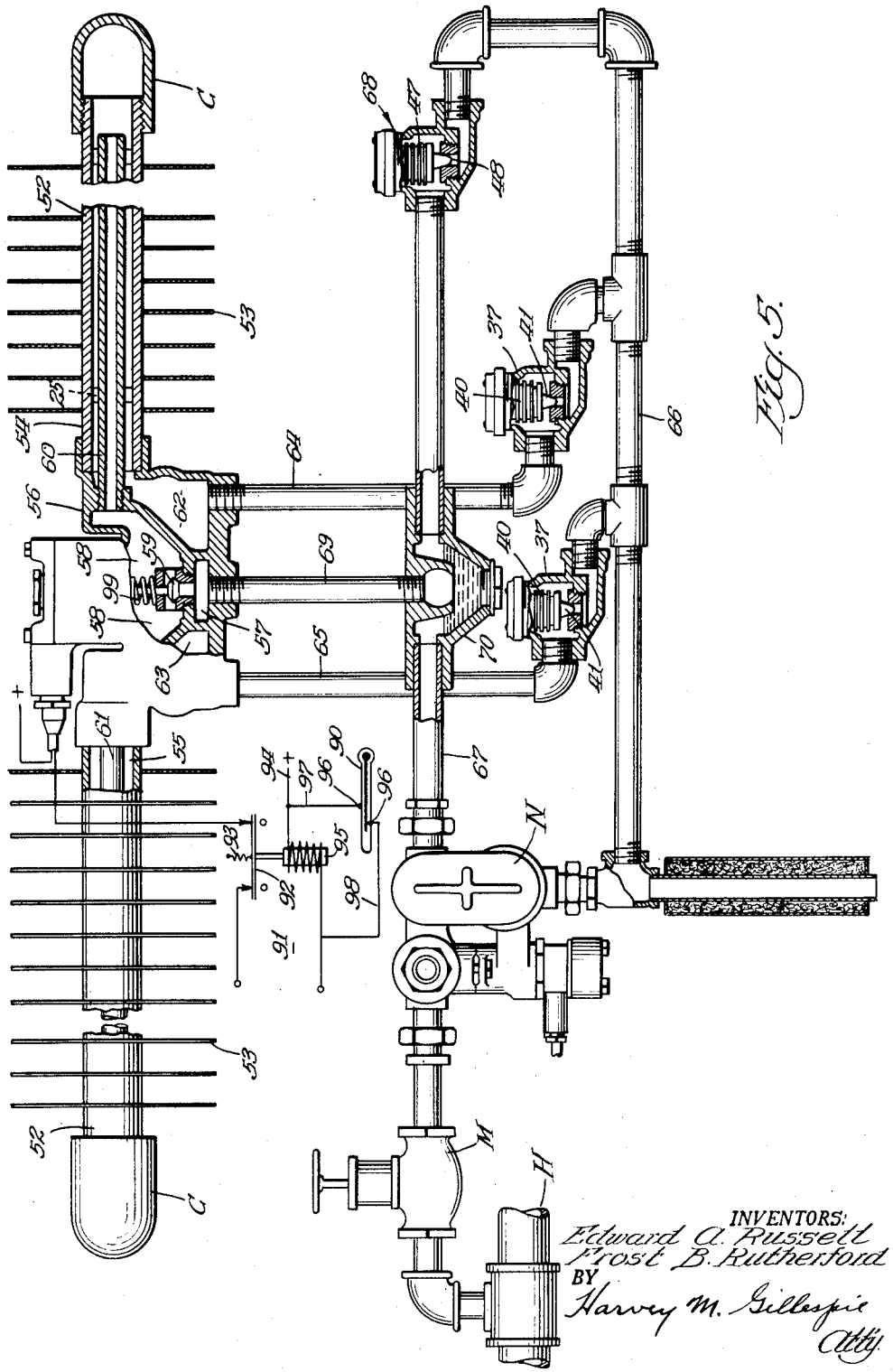

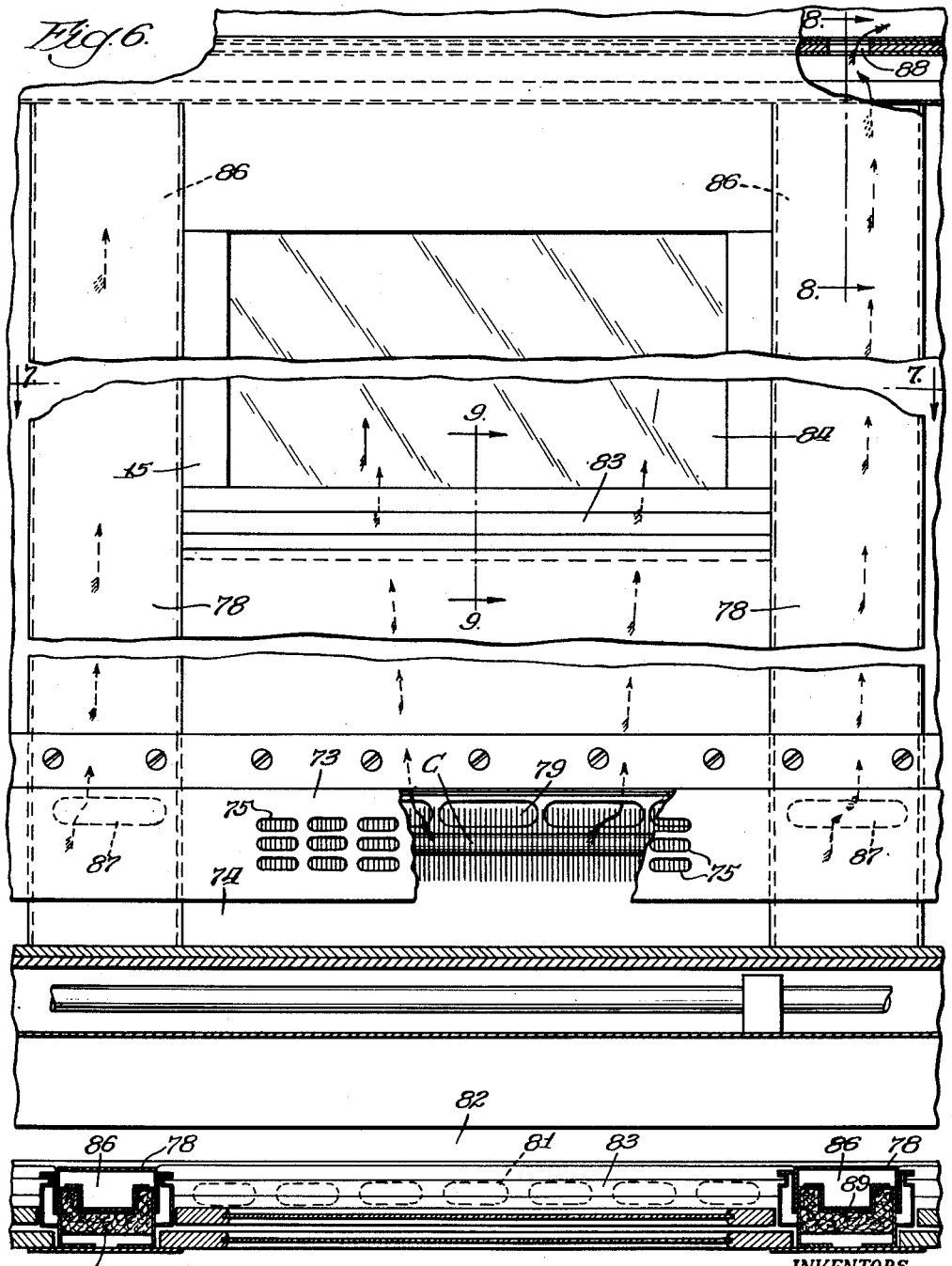

Dec. 12, 1950  E. A. RUSSELL ET AL  2,534,148
COMBINED RADIANT AND AIR HEATING SYSTEM
Filed June 21, 1947  6 Sheets-Sheet 6
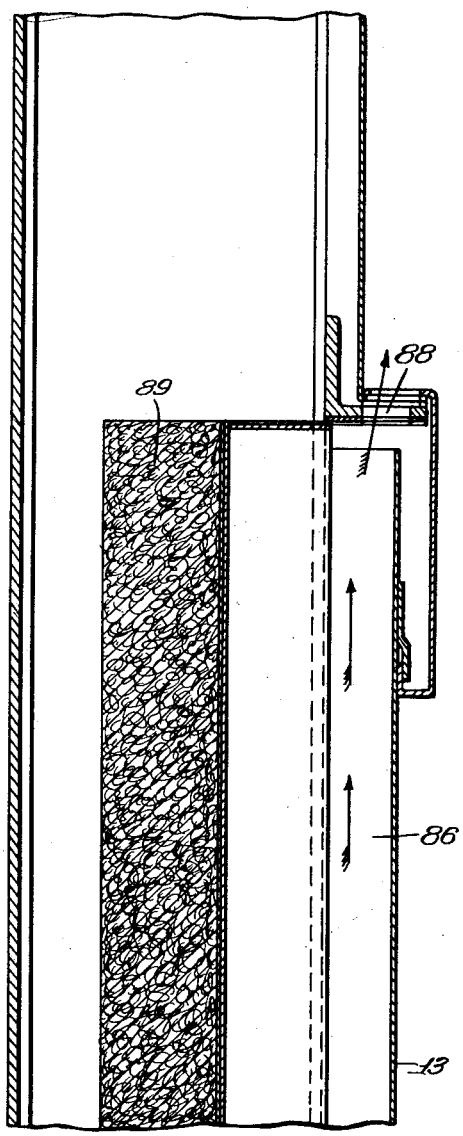
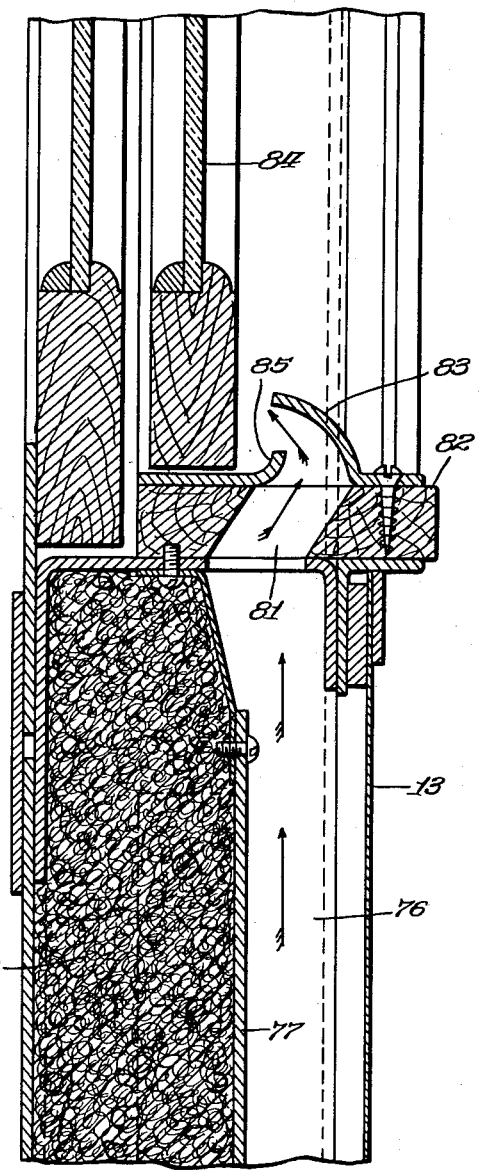

Patented Dec. 12, 1950

2,534,148

UNITED STATES PATENT OFFICE 2,534,148

COMBINED RADIANT AND AIR HEATING SYSTEM

Edward A. Russell and Frost B. Rutherford, Chicago, Ill., assignors, by mesne assignments, to Vapor Heating Corporation, a corporation of Delaware Application June 21, 1947, Serial No. 756,222

2 Claims. (Cl. 237—6)

This invention relates to heating systems for railway cars and has for its principal object to provide, in a heating system of the above character, certain new and improved arrangements of the heating elements, whereby the passenger space within a railway car may be heated by the combined effects of radiant heat introduced through the floor and side wall structures of the car and by streams of heated air delivered into the passenger space of the car at various elevations above the floor level thereof.

Another and more specific object of the invention is to provide a simplified arrangement of heating elements beneath the floor of a railway car which, in addition to providing maximum heating effects with relatively low heat loss insures adequate heating of the end portions of the car and simplifies the installation of the heating elements and their connections to the main supply and discharge conduits of the system.

Another object is to provide a simplified arrangement of certain of the heating elements in relation to hot air ducts formed in the wall structures of the car so that these heating elements will function to deliver heated air directly into the car near the floor thereof and to also deliver streams of the heated air into the car at various levels so as to effect uniform distribution of heat through the interior of the car.

A further object is to provide suitable conduit arrangements in the side wall structure of the car whereby the heated air passing through said conduits serves to warm the inner wall panels of the car and to discharge heated air into the car at locations whereby the air is caused to pass across the glass window pane in the side wall structure and thereby supplies additional heat at these normally cool areas and to compensate for the normally greater heat loss through the windows.

One approved form of the invention is illustrated in the accompanying drawings wherein:

Fig. 1 is a diagram showing a preferred arrangement of piping for the heating elements beneath the main floor of a railway passenger car and showing also a preferred arrangement of heating elements adjacent the side wall structures of the car together with supply loops for delivering heating medium to the various heating elements.

Fig. 2 is a fragmentary plan view of the arrangement of one group of floor heating elements shown in Fig. 1.

Fig. 3 is a cross-sectional view taken substantially on line 3—3 of Fig. 1 through portions of the floor and side wall structures of the car and showing the arrangement of heating elements beneath the car floor and the arrangement of another heating element adjacent the side wall structure of the car.

Fig. 4 is a fragmentary sectional view taken substantially on line 4—4 of Fig. 2 showing a flow path of the heating medium through one of the floor heating elements.

Fig. 5 is a fragmentary sectional view taken substantially on line 5—5 of Fig. 1 to illustrate the flow path of the heating medium through one of the side panel and air heating elements.

Fig. 6 is a view showing the inside face of the car wall structure shown in Fig. 3, parts of the side wall and the heating element housing being broken away for the purpose of clearness.

Fig. 7 is a sectional view taken on line 7—7 of Fig. 6 through the wall and window structure shown in Fig. 6.

Fig. 8 is a sectional view taken substantially on line 8—8 of Fig. 6.

Fig. 9 is a fragmentary sectional view taken on line 9—9 of Fig. 6 so as to illustrate, on a somewhat larger scale, the construction of a hot air duct which is arranged back of the side wall panel below the window sill structure of the car.

The railway car is designated generally by the reference numeral 10 and comprises a main floor 11, a sub-floor 12 and side wall structures 13—14, the said wall structures being formed with a plurality of windows 15. However, the specific construction of the car body is intended merely as an illustration of one suitable form and is not to be considered as a limitation. Obviously the arrangement of the heating elements herein shown may be varied to accommodate variations in the car structure.

The invention, in its broader aspect, includes the provision of heating elements arranged between the main floor 11 and the sub-floor 12 of the car so as to heat the floor 11 of the car and deliver radiant heat through the floor into the passenger space. The heating elements positioned beneath the floor of the car are arranged preferably in groups designated A and B which extend lengthwise of the car at opposite sides of the longitudinal center so as to heat the floor areas which are normally occupied by the passengers. There are other heating elements arranged in groups C—D and E—F positioned in the passenger space of the car for heating the side walls 13 and 14 thereof and for delivering heated air into the passenger space.

Referring to the specific constructions of the floor heating elements: The arrangement and construction of these elements are substantially the same for both groups A and B. Consequently it will be sufficient to describe the construction of the elements of group A and identify the corresponding elements of group B with like reference characters provided with exponents a. The said heating elements of group A are designated 16—17, 18—19 and 20—21. Each pair of said heating elements extends from a predetermined location toward opposite ends of the car. Each heating element of the group A comprises an outer pipe 22 clamped to the sub-floor 12 of the car by blocks 23, shown best in Fig. 2. An inner feed pipe 24 is suitably supported within the outer pipe 22 by supporting elements 25 and the inner ends of the said feed pipe is connected to an adapter fitting 26. This fitting engages over the inner end of the outer pipe and includes an outlet port 27 for the discharge of condensation.

Heating medium, for example steam at substantially atmospheric pressure, is supplied to the inner pipe 24 of each heating element through a supply manifold 28 which leads from an inlet valve 29. The steam passes through the inner pipe 24 and enters the outer pipe 22 at the outer end thereof and flows back through the outer pipe toward the adapter fitting 26. By causing the steam to flow from the inner feed pipe 24 into the remote end of the outer pipe 22 the steam, while at its maximum temperature, enters the outer pipe and insures proper warming of the floor areas of the car near the ends thereof, which areas of the floor are normally more difficult to heat than the portions near the middle of the car, because of the normally greater heat loss near the ends of the car. The outlet ports 27 of heating elements 16 and 18 are connected by a header 30 to a single discharge conduit 31. The discharge ports 27 for heating elements 17 and 19 are connected by means of a similar header 32 to a discharge branch 33, and the heating elements 20 and 21 are connected to a discharge branch 34. All of the discharge branches 31, 33 and 34 lead into a common discharge conduit 35 which forms a part of a steam supply loop and serves as a drain for all heating elements of groups A and B. Each of the said discharge branches is provided with a steam trap or retarder device 36 which permits the discharge of condensate from the outlet branch but prevents the discharge of any substantial quantity of steam. Each retarder device includes a casing 37 formed with a partition 38 which is provided with a port 39. A bellows thermostat 40 is secured to the upper portion of the case 37 and carries a valve 41 for closing the port 39 when the bellows 40 is expanded by the temperature of the steam.

The inlet valves 29—29a for the heating element groups A and B are located in chambers 42—42a beneath the main floor 11 of the car. Both chambers 42—42a are provided with hinged closures 43—43a so that the valves are readily accessible from the inside of the car.

The said valve chambers 42—42a and the upper surface of the sub-floor 12 are lined with heat insulating material 44 and 45, respectively, so as to minimize dissipation of heat to the outside of the car.

Steam at low pressure is supplied to the inlet valves 29—29a of the heating element groups A and B by means of a steam supply loop designated generally by the reference character G. This steam supply loop is constructed to function substantially in accordance with the disclosure of United States Letters Patent 2,271,778, dated February 3, 1942. A supply loop of this general character is shown in Figs. 1 and 4 of the present application so as to complete the disclosure and may be briefly described as comprising a main source H of high pressure steam which flows through suitable valved connections including a shut-off valve I and a steam pressure regulator J. The steam pressure regulator J is of known construction and functions to reduce the pressure of the steam delivered into the steam supply side 46 of the supply loop G. A steam trap for retarder K is interposed in the loop G so as to divide the loop into the said steam supply side 46 and the outlet side 35. The steam passing through the vapor regulator J flows into the supply side 46 of the loop G and engages a bellows thermostat 47 so that the heat of the steam will cause the bellows to expand and thereby close the outlet port 48 of the retarder. However, when condensate collects in the supply side 46 of the loop G the bellows thermostat 47 will contract and thereby open the port 48 to permit the discharge of the collected condensate. However, when the steam again contacts the bellows 47 it will again expand under the influence of the steam temperature to close the said port 48 and thereby permit the desired pressure (approximately 5 to 6 pounds) to be maintained in the steam supply side of the loop.

The steam is fed to the inlet valves 29—29a through branch inlet pipes 49 and 50. These branch supply pipes are connected to a steam supply side of the loop through water seal elements 51 constructed to prevent the steam entering into the inlet branches when the inlet valves 29—29a are closed.

The flow path of steam to the heating elements of groups A and B is shown best in Fig. 4. The steam flows from the said source of supply H through the shut-off valve I to the vapor regulator in which the pressure of the steam is reduced and thereafter delivered into the supply side 46 of the loop G. When an inlet valve 29 or 29a is opened to admit steam into its associated group of heating elements, the steam pressure in the supply side 46 of the loop G displaces the water seal in the device 51 and steam is fed through the open inlet valve into the supply manifold 28 or 28a, as the case may be. The steam then flows from the said supply manifold through the inner feed pipe 24 to the remote end of the outer pipe 22 at which place the steam enters the outer pipe and returns toward the outlet port 27 of the adapter 26. If the bellows thermostats in the retarders 36 in the outlet branches from the heating elements are open the temperature of the steam will cause the bellows to expand and thereby close the outlet until sufficient condensate collects in the outlet branches to bring about a cooling and consequent contraction of the bellows to open the outlet port.

Referring now to the heating element groups C and D adapted to heat the side wall portions of the car and to heat air introduced into the car at different locations. The said groups of heating elements C and D are preferably of identical construction. Consequently it will be sufficient for the present disclosure to describe the group of heating elements C in detail and identify corresponding elements in group D with the same reference characters provided with exponents *a*.

The groups C of heating elements are constructed similar to the heating elements of groups A and B, but the outer papes 52 are provided throughout their length with spaced fins 53 to provide the heating elements with extended heat radiating surfaces. The inner ends of the heating elements designated 54 and 55 are connected to a two-way inlet valve 56. The said inlet valve includes a casing provided with a chamber 57 and a low pressure chamber 58. A valve device 59 controls the passage of steam from chambers 57 to 58. The inner feed pipes 60—61 for the heating elements 54—55, respectively, communicate with the low pressure chambers 58 of the inlet valve and extend to substantially the remote ends of the heating elements 54—55 so as to deliver steam into the said remote ends of the heating elements. The steam then flows back toward the valve structure and discharges into outlet chambers 62—63. These outlet chambers are connected by means of branch discharge conduits 64—65 to the main discharge conduit 66 of a steam supply loop L. This steam supply loop may be, and preferably is, the same in general construction as the supply loop G previously described. It leads from the main source of steam supply H through a shut-off valve M through a vapor regulator N which corresponds in construction to the previously described vapor regulator J. The steam at reduced pressure is delivered from the vapor regulator N into the supply side 67 of the supply loop L. A retarder device 68 is located in the loop L at the end of the steam supply side thereof so that the desired steam pressure can be maintained in the said supply side 67 of the loop L. The steam is delivered through inlet branches 69 which lead from a water seal to device 70 to the chamber 57 of inlet valve 56. After the steam has passed through the heating elements 54—55 as previously described, the condensate is discharged from the system through the branch discharge pipes 64—65 and through the retarders 71—72 to the main discharge conduit 66 of the loop L.

The groups E and F of heating elements may be identical in structure to the groups C and D with exception, possibly, as to the specific arrangement and heating capacity. However, the steam supply loop for delivering steam to the inlet valves of these groups and the discharge conduits together with the retarder devices and the water seals are constructed so as to function in substantially the same manner as disclosed in connection with the heating element groups C and D. The corresponding elements of the said groups of heating elements E and F are therefore identified with the same reference characters as the groups C and D but distinguished therefrom by the addition of a prime exponent.

The finned radiators are preferably enclosed in housings 73 located at opposite sides of the car and extend lengthwise thereof. The lower edges 74 of the housings are spaced above the floor level as shown in Fig. 3 so as to permit air to enter the housing and pass upwardly around the finned heating elements. A portion of the heated air is discharged directly into the passenger space of the car through openings 75 in the front face of the housing. Another portion of the heated air passes into air passages located back of the wall panels at opposite sides of the car. One form of these passages is located beneath each of the windows of the car and is designated 76. The outer wall of this air passage 76 is defined by a concealed panel 77 which extends, in each case, beneath a window structure and is secured at opposite vertical edges to the vertical pier structures 78—78 located between adjacent windows. The heated air enters the passages 76 through openings 79 cut in the base panel 80 and the heated air is discharged at the upper end of said passages through elongated openings 81 formed in each of the several window sills 82. Preferably each window sill is provided with a deflector strip 83 arranged adjacent the elongated openings 81 so as to deflect the air discharge from the openings toward the window 84 and thereby provide a comfortably heated area adjacent each window.

The heated air passing up through the passages back of the wall panels serves to heat the panels to a comfortable temperature, whereby radiant heat is delivered into the passenger space from the wall panels in addition to the heated air delivered from the several air passages.

In order to provide a construction which will minimize any tendency which the passageway may have to deposit foreign matter in the openings 81 through the window sill, a deflector plate 85 is positioned on each window sill adjacent the openings 81 so as to project beneath the lip of the deflector 83.

At locations between adjacent windows the vertical window piers 78—78 are utilized to provide vertical air passages 86—86 which lead from openings 87 in the side wall panel adjacent the finned heating elements to outlet openings 88 above and at the side of each window structure. Layers of heat insulating material 89 are secured in position adjacent the outer panel of the vertical air passages 76 and 86 so as to minimize the dissipation of heat to the outside of the car and thereby insure maximum effectiveness of the heated air delivered into the passenger space of the car.

It will be noted that each of the inlet valves for controlling the supply of heating medium to the various heating elements is provided with an electrical solenoid for controlling the operation of the valve element. This construction, therefore, makes it practicable to control the operations of the several inlet valves by means of thermostats arranged at various locations within the car and corresponding with zones substantially co-extensive with the position of the several groups of heating elements. In this way delivery of heating medium to the various groups of heating elements may be controlled in relation to the heat demand for the various heating zones in the car as defined by the several thermostats. Diagrammatic illustrations of suitable electrical controls are shown in connection with Figs. 4 and 5 and include, in each case, a thermostat 90 of the mercury column type and a relay 91, the latter of which is controlled by the functioning of the thermostat. The bridge 92 of the relay is connected in series with the solenoid of the inlet valve and is normally closed by a spring 93 so as to energize the valve. The valve, however, is normally energized closed. The energizing circuit 94 for the relay solenoid 95 is controlled by the thermostat 90. When the temperature in the zone controlled by the thermostat 90 is such as to maintain the mercury column above the upper contact 96 the electric current is by-passed around the relay solenoid 95 through wires 97 and 98 and thereby de-energize the solenoid 95 when the temperature at the thermostat 90 is such as to cause the mercury column to move below the upper contact 96. The electric current is passed through the solenoid 95 so as to open the relay contacts and thereby permit the inlet valve to open by means of a spring 99.

We claim:

1. The combination with a railway car having an enclosed body provided with a floor structure comprising a main floor and a sub-floor spaced from the main floor and with side wall structures formed with a series of windows therein having window sills, and spaced panels defining air ducts back of the inner panel and beneath said windows, of means for heating the interior of the car by the combined effects of radiant heat and streams of heated air, said heating means comprising heating elements positioned between said floors for delivering radiant heat through the main floor into the interior of the car, wall heating elements located in the car and extending along opposite walls thereof at locations near the main floor, means for supplying heating medium to the floor heating elements and the wall heating elements, housings for the wall heating elements secured to the wall of the car and having their lower edges spaced from the main floor so as to provide air entrance passages leading from the interior of the car into the housings, means defining air passages leading from said housings into the air ducts between the wall panels, whereby the inside panel of the car body is heated by the hot air moving upwardly in said ducts back of said inner panels and radiant heat is directed into the car from the inner surfaces of said inner panels, means defining hot air outlets from said air ducts through the window sills of the car, and deflector elements positioned to overlie said outlets and adapted to deflect the heated air discharged therefrom toward the window panes of said windows.

2. The combination with a railway car having an enclosed body provided with a main floor and a sub-floor, of a steam heating system for the car comprising floor heating elements arranged in separate groups at opposite sides of the longitudinal center of the car and positioned between said floors for delivering radiant heat into the car through the main floor, heat insulating material interposed between said heating elements and the sub-floor, separate electrically controlled inlet valves positioned at opposite sides of the car responsive to changes in temperature at predetermined locations within the car for controlling the admission of steam to the separate groups of heating elements, means for supplying steam to said valves at low pressure comprising a conduit loop exclusive of the heating elements and extending transversely of the car, a thermostatic valve in said loop dividing it into a steam supply side and an outlet side, the latter of which is open to the atmosphere, branch inlet pipes leading from the steam supply side of said loop to the separate inlet valves, a plurality of connected branch discharge outlets leading from a plurality of heating elements of the several groups to the outlet side of said loop, and a thermostatic valve responsive to the combined temperatures of said outlet branches to open and close said outlet branches.

EDWARD A. RUSSELL.
FROST B. RUTHERFORD.

REFERENCES CITED

The following references are of record in the file of this patent:

UNITED STATES PATENTS

| Number | Name | Date |
| --- | --- | --- |
| 1,131,927 | Gold | Mar. 16, 1915 |
| 1,521,643 | Moorshead | Jan. 6, 1925 |
| 1,913,002 | Russell et al. | June 6, 1933 |
| 1,951,521 | Mussey | Mar. 20, 1934 |
| 2,044,733 | Mussey | June 16, 1936 |
| 2,179,873 | Anderson et al. | Nov. 14, 1939 |
| 2,213,053 | Russell | Aug. 27, 1940 |
| 2,265,536 | McFarlane | Dec. 9, 1941 |
| 2,271,778 | Parks et al. | Feb. 3, 1942 |